United States Patent
Gfeller

[11] Patent Number: 6,035,144
[45] Date of Patent: Mar. 7, 2000

[54] STILL PHOTO CAMERA

[75] Inventor: Karl Gfeller, Langwiesen, Switzerland

[73] Assignee: Sinar AG, Feuerthalen, Switzerland

[21] Appl. No.: 09/031,921

[22] Filed: Feb. 27, 1998

[30] Foreign Application Priority Data

Feb. 28, 1997 [EP] European Pat. Off. .............. 97103340

[51] Int. Cl.$^7$ .................................................. G03B 13/02
[52] U.S. Cl. ........................... 396/374; 396/387; 396/429
[58] Field of Search ..................................... 396/374, 429, 396/387

[56] References Cited

U.S. PATENT DOCUMENTS

| | | |
|---|---|---|
| 4,404,586 | 9/1983 | Tabei . |
| 4,692,006 | 9/1987 | Rice et al. .............................. 396/374 |
| 4,738,526 | 4/1988 | Larish . |
| 4,774,537 | 9/1988 | Moody . |
| 4,814,811 | 3/1989 | Saito et al. ............................... 396/387 |
| 4,823,199 | 4/1989 | Sakakibara et al. ..................... 358/335 |
| 4,862,293 | 8/1989 | Saito et al. .............................. 360/35.1 |
| 4,973,999 | 11/1990 | Hoffman, Jr. et al. . |
| 5,034,822 | 7/1991 | Stevens . |
| 5,282,040 | 1/1994 | Sapir . |
| 5,483,284 | 1/1996 | Ishiguro . |
| 5,493,353 | 2/1996 | Chen . |
| 5,561,458 | 10/1996 | Cronin et al. .............................. 348/64 |
| 5,570,146 | 10/1996 | Collette . |
| 5,592,221 | 1/1997 | Mielke . |
| 5,678,102 | 10/1997 | Chamberlain IV ..................... 396/429 |

FOREIGN PATENT DOCUMENTS

| | | |
|---|---|---|
| 3316009 A1 | 11/1984 | Germany . |
| 296 12 423 U1 | 12/1996 | Germany . |
| WO 95/15054 | 6/1995 | WIPO . |

*Primary Examiner*—Russell Adams
*Attorney, Agent, or Firm*—Watson Cole Grindle Watson P.L.L.C.

[57] ABSTRACT

A still photo camera for film and electronic image recording selectively employs various media and media evaluation modes with selectable mechanical, optical and electronic imaging.

25 Claims, 4 Drawing Sheets

STILL PHOTO CAMERA

BACKGROUND OF THE INVENTION

Field of the Invention

The invention concerns a still photo camera, and in particular a still photo camera adapted to use film and electronic media.

Still photo cameras are known which use various recording media. Some still cameras use conventional film materials, i.e., chemical image recording. Others use electronic image recording, i.e., photoelectric converters, electronic signal processing and electronic signal storage. Still cameras that use more than one medium are difficult to handle and flexibility when switching from one to the other is limited.

SUMMARY OF THE INVENTION

The invention has the goal of significantly increasing the handling flexibility when changing from photography with conventional film material to photography with electronic image recording This goal is achieved in a still photo camera which is characterized by the features of claim 1, which according thereto proposes the inclusion in one and the same still photo camera film for chemical image recording and an electronic arrangement for electronic image recording, to be selected as desired. With respect to image evaluation which concerns image composition, image detail, depth of sharpness, entry of light, the invention further proposes the provision of an adjusting disk. In an exemplary embodiment the particular image disk is in the form of a ground glass disk. The adjusting disk may be inserted into the image beam path. The adjusting or image evaluation disk is introduced into the focal plane. The adjusting disk may be movably positionable in a spring loaded support, so that, when positioned in the image beam path of the camera, it may be pushed behind the focal plane during emplacement of the film media or the electronic image recording media.

The camera, film and electronic arrangement may be constructed using an adapter or intermediate parts, so that a film cassette for the film or the electronic arrangement can be mounted on the camera housing if desired. Alternatively, a coupler device which can move linearly or by a swinging action may be employed. The coupler has a receptacle for the film and a receptacle for the electronic arrangement. If necessary, the camera may employ another receptacle for the adjusting disk. Using the coupler device, the desired receptacle is selected and moved into the image beam path of the camera.

During image recording the exposure time is adapted to the medium, in particular for film but also if necessary for the electronic arrangement, according to the appropriate sensitivity of the selected recording medium and the light intensity.

In an exemplary embodiment of the invention, the electronic arrangement may include a monochrome arrangement or multi-chrome arrangement, or both. These arrangements may also employ a charge coupled device (CCD) and, if desired, a mosaic filter. If both arrangements for electronic image recording are provided, the flexibility of the camera will be further increased in that a rapid change can be made from electronic monochrome recording to electronic multi-chrome recording.

If a monochrome arrangement is provided for electronic image recording with or without a multi-chrome arrangement, a filter arrangement with a number of select-able narrow band color filters may be used. The filters may be introduced, when desired, into the image beam path, by, for example, a motor provided on the camera. In an exemplary embodiment, the lens may be interchangeable and the filters may be introduced between the interchangeable lens and the focal plane. For additive processes, one each of a red, green and blue (RGB) filter may be employed as the narrow band color filters. For color printing in subtraction processes, cyan, magenta, yellow and black (CMYK) filters may be employed.

When the color filters are positioned in the lens screen area or in front of the lens, no increase of the focus will occur as a result. However, if as preferred, a compact and easy to handle component camera system is desired, the color filter arrangement is placed between the interchangeable lens and the focal plane where the monochrome CCD arrangement may be moved. As a result the filters cause an increase of focus corresponding to the following relationship:

$$\Delta f = d \times n - 1/n$$

where
d=filter glass thickness, and
n=refractive index of the filter glass material.

During the evaluation operation, this may be accounted for in a simple manner by introducing into the image beam path a passive image evaluation disk such as a broad band, white-light-transmitting disk with appropriate thickness and an appropriate refractive index that simulates the focal relationships of the color filter that are to be later employed.

In place of, or in addition to, the passive image evaluation disk, an active device such as a photoelectric converter arrangement with a live image display screen or with a connection for an external display may be provided.

During active image evaluation using a CCD and by means of a live image display, the image is optically scrambled with a given frequency of two to five Hz. This may be accomplished by means of an electronic connection which may also be provided to the mechanical camera shutter. In an exemplary embodiment optical scrambling is achieved by means of an LCD shutter driven with clock pulses. In such arrangement the electronic shutter, for example, the LCD shutter with color filters, may cause lengthening of the focus. Since the LCD shutter is only positioned in the image evaluation mode and the color filters normally only in the image recording mode by means of the monochrome arrangement, the LCD shutter compensates for the lengthening of focus caused by the filters.

By providing a multi-chrome arrangement for the electronic image recording, for example, a CCD arrangement with mosaic filters, the focal length relationships may be taken into consideration during assembly or insertion of the above-mentioned arrangement by appropriate staggering of the depth of the focal plane on the slide.

During image recording with a multi-chrome arrangement for electronic image recording, the focal length change is compensated for by a broad-band, transmitting disk in the image recording mode and by the LCD shutter in the image evaluation mode.

In order to ensure the highest possible degree of compactness in the camera, the color filters, the broad-band transmitting disk, the LCD shutter and one or more open screen segments may be mounted on one or more motor-driven carrier wheels. An exemplary embodiment employs two separate, independent, adjustable carrier wheels.

The image evaluation may be conducted using an adjusting disk, or an electronic image acquisition arrangement, at times equipped with a live image display. The actual image recording may be made on film or electronically. Appropriate optical devices are inserted for the image evaluation mode and the image recording mode. This may be accomplished automatically by means of an input device for selecting in the image evaluation mode, an adjusting disk, or an electronic image acquisition arrangement and possibly sensors for the acquisition of the current input image evaluation medium. Other input devices may be employed for automatic selection of the image recording medium, the automatic electronic shutter, the broad-band filter compensating disk, the color filters, and the open screen elements, as required in accordance with the selected image evaluation medium and image recording medium.

BRIEF DESCRIPTION OF THE DRAWINGS

The invention will be explained using drawing examples whereby one of skill in the art can appreciate the essential characteristics of this invention based upon the description.

DESCRIPTION OF THE INVENTION

Figure 1:
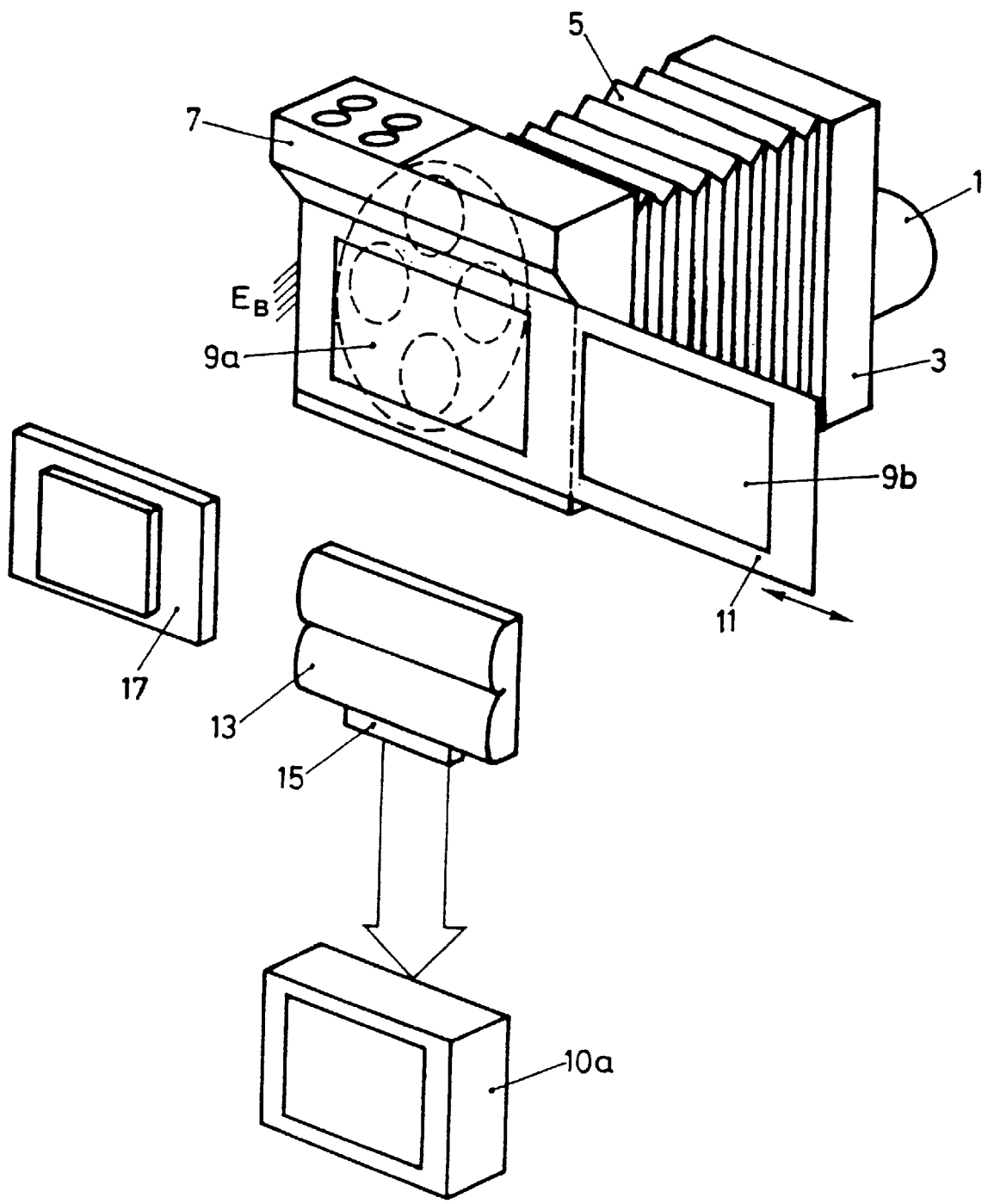
FIG. 1 is a simplified, schematic representation in perspective of a still photo camera according to the invention in a so-called execution model.

A still photo camera illustrated in FIG. 1 incorporates in the usual manner an interchangeable lens 1 mounted, for example, on a lens plate 3 which is connected to the camera housing 7, for example, by means of a bellows 5. The housing has a focal plane EB which is schematically depicted. FIG. 1 shows a particular, so-called execution model in which the at least two receptacles 9a and 9b are positioned on a linear slide 11. The receptacles 9a and 9b may be selectively introduced into the image beam path of the camera in alignment with the lens.

A monochrome or multi-chrome electronic arrangement 13 for electronic image recording has electric outputs 15. The electronic arrangement 13 may be inserted as desired in the receptacle 9b or 9a, for example, by means of a snap lock attached thereto. A film carrier cassette 17 may also be locked in receptacle 9a or 9b. A screen display 10a may be connected to the outputs 15 of the electronic arrangement 13 for producing a live display or image.

The film cassette 17 and the electronic arrangement 13 may be introduced into the camera housing 7 in a variety of ways, including by means of a slide, as shown at 17, or by means of a rotary disk valve or by means of a single combination receptacle slit where the corresponding cassettes 13 and 17 can alternately be inserted. Such alternatives are available to one of skill in the art and need not be further described.

Figure 2:
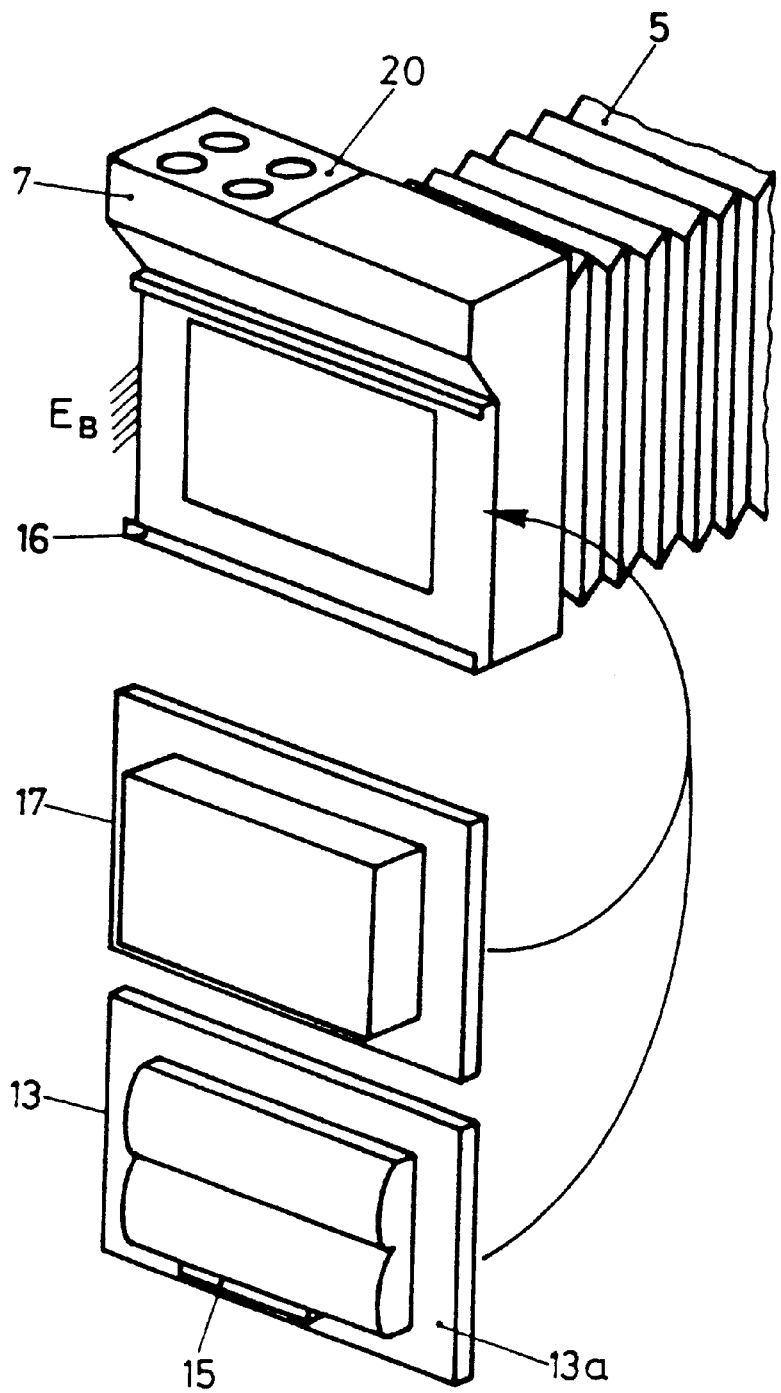
FIG. 2 is a representation of another embodiment illustrating a simplified execution model of the camera shown in FIG. 1.

FIG. 2 shows a simplified execution model of the still photo camera of the invention wherein the film 17 or the electronic arrangement 13 are alternately inserted into the image beam path by means of an appropriate positioning or locking device 16. Here the film 17 and the electronic arrangement 13 employ respective adapter plates 17a and 13a and form a set, so that the recording media may be alternatively attached to the camera and may match both the shape and the positioning of attaching means provided on the camera.

Figure 3:
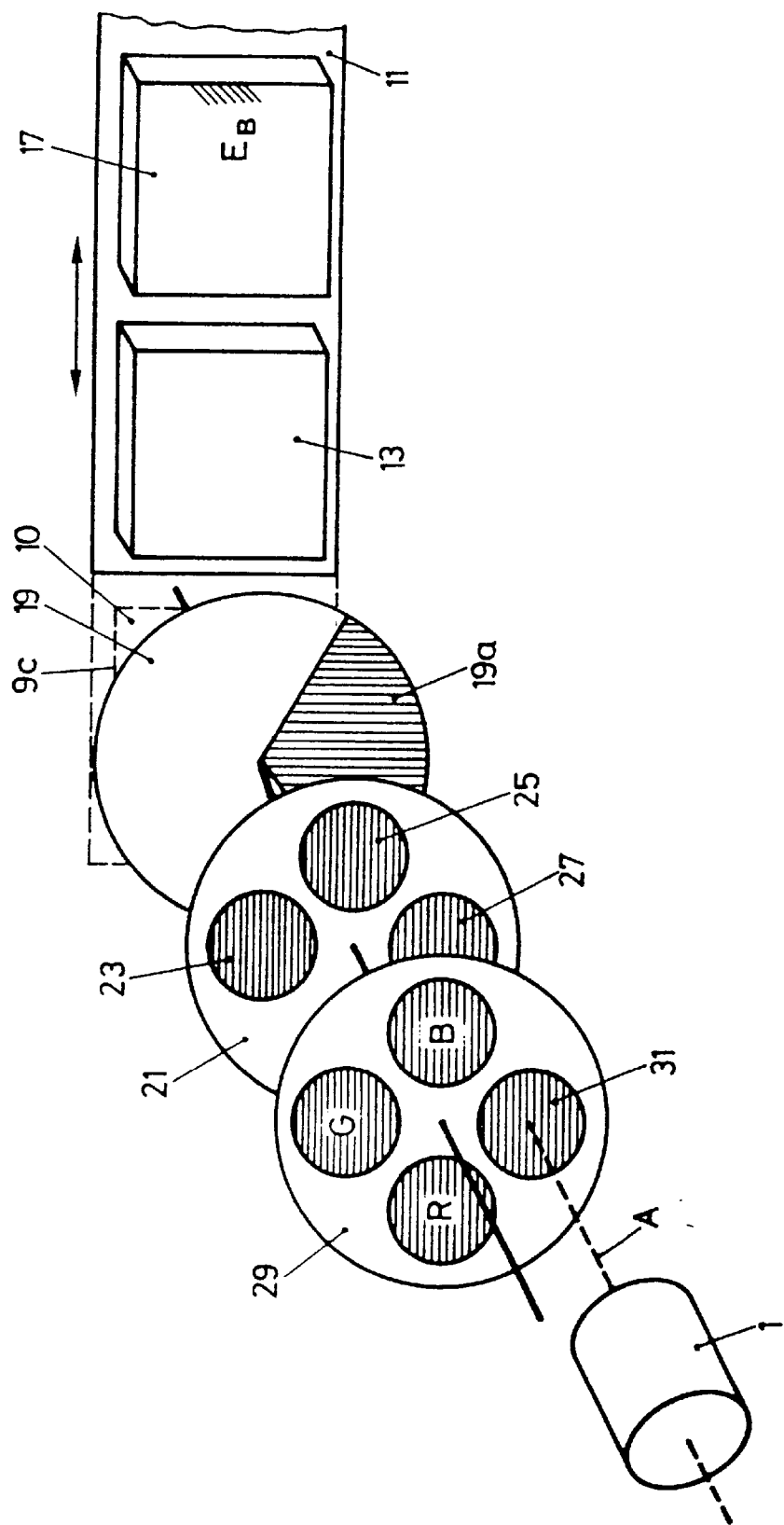
FIG. 3 is a schematic view in perspective of an arrangement of optical devices for use in the still photo camera shown in FIGS. 1 and 2.

FIG. 3 schematically shows in perspective various optical devices of the invention that may be incorporated in an execution model of the still photo camera.

A mechanical shutter 19 extends in front of the focal plane EB. The shutter 19 may be in the form of a motor-driven rotating shutter disk with variable sector openings 19a.

A motor-driven carrier disk 21 may be positioned in front of the shutter 19 against the lens 1. The disk 21 is positionable at selectable rotation angles and incorporates an LCD shutter segment 23, an adapting disk segment 25 containing a white-light transmitting, focal length adapting disk of a given thickness and refraction index and an empty or open screen segment 27.

Another motor-driven, filter carrier disk 29 may be positioned in front of the shutter 19 and carrier disk 21 against the lens 1. The carrier disk 29 is positioned at selectable rotational angles and may be equipped, for example, with narrow-band filter segments R, G and B and an empty segment or open screen 31.

An adjusting disk 10, which may be in the form of a ground glass disk, is mounted on an extension of slide 11. The arrangement is similar to that of FIG. 1 with an additional receptacle 9c. The adjusting disk is located in the focal plane EB for image evaluation prior to image registration or image recording. As shown, the arrangement may be on slide 11 as shown by a dotted line in FIG. 3, or on the camera itself as in the execution models of FIG. 1 or FIG. 2 as discussed below.

Figure 4:
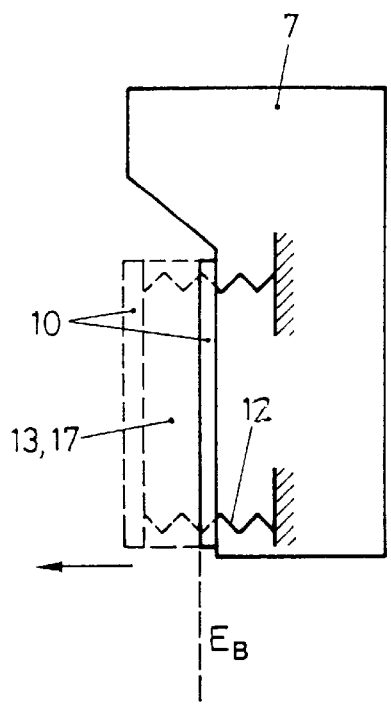
FIG. 4 is a schematic view of an adjusting disk for use in the camera shown in FIGS. 1 and 2.

In the execution models of FIG. 1 or FIG. 2, the adjusting disk 10 may be positioned into an area of the focal plane EB as shown schematically in FIG. 4. In the exemplary embodiment the adjusting disk 10 is positioned on the camera housing 7, so that it may be displaced by spring action. In the image evaluation mode the disk 10 lies in the focal plane EB and is displaced from the focal plane by introducing the film 17 or the electronic arrangement 13 into the focal plane EB. Thus, during the image recording mode the disk 10 is positioned as shown by the dotted lines (to the left in FIG. 4) behind the corresponding image recording medium 13 or 17.

Alternatively, the image evaluation can take place directly in the electronic arrangement 13 when it is incorporated on the slide 11 in FIG. 1 or is mounted on the camera housing 7 as in FIG. 2. This can be so, not only when the electronic arrangement 13 for image recording includes a multi-chrome arrangement (e.g., a CCD arrangement with mosaic filters), but also when it employs a monochrome arrangement. In such cases image evaluation occurs on a live image display or a picture screen 10a (FIG. 1) which is attached to the outputs 15 of electronic arrangement 13. The picture screen 10a may be positioned on the camera itself or may be mounted externally.

For image recording with film, image evaluation is first performed using either the adjusting disk 10 or the electronic arrangement 13. In the latter case the electronic arrangement 15 acquires the image electronically, and the exposure is chopped by a given frequency, for example 2 to 5 Hz. Although this can be done, if necessary, by means of the mechanical shutter 19, the LCD shutter segment 23 on the carrier disk 21 is preferably swung into the image beam path A (FIG. 3) by a motor (not shown). As noted above, the LCD shutter 23 used in the evaluation mode causes a focal length change. Accordingly, during image recording on film, the white-light transmitting disk 25 on the carrier wheel 21 is swung in place of the LCD shutter segment 23 into the image beam path A in order to correct the focal length change caused by the LCD. During film recording the empty or open screen 31 on the carrier wheel 29 is swung into the image beam path A both in the image evaluation mode as well as in the image recording mode. Image recording occurs using the mechanical shutter 19.

During electronic image recording using a multi-chrome arrangement such as a CCD arrangement with mosaic filters, image evaluation may occur either using the adjusting disk 10 or directly by means of the multi-chrome arrangement 13 which can also be used for image registration.

If the disk 10 is used for image evaluation, open screen 31 on the carrier wheel 29 and open screen 27 on the carrier wheel 21 are swung into the image beam path. The same arrangement is also for the image recording.

If image evaluation occurs on the multi-chrome arrangement that is also used for image recording or on a monochrome arrangement, then the open screen 31 on carrier wheel 29 and the LCD shutter segment 23 on the carrier wheel 21 are swung into the image beam path A. In the image recording mode the open screen 31 remains in position and the white-light transmitting disk 25 on carrier wheel 21 is moved into the beam path A.

If image recording occurs by means of a monochrome arrangement, image evaluation can again occur by means of the adjusting disk 10 or by means of the electronic arrangement 13. In the image evaluation mode using the disk 10, the open screen 31 on the carrier wheel 29 and the white-light transmitting disk 25 on carrier wheel 21 are swung into the image beam path. In the image recording mode, one of the color filter segments R, G or B on carrier wheel 29 and open screen 27 on carrier wheel 21 are swung into the image beam path A.

If image evaluation in such case occurs by means of the electronic arrangement 13, which also acts as an image acquisition arrangement, then in the image evaluation mode, clear screen 31 and LCD shutter segment 23 are swung into the image beam path. In the image recording mode one of the color filter segments R, G, B on carrier wheel 29 and open screen segment 27 on carrier wheel 21 are swung into the beam path A.

The following table shows the three image recording media: film, multi-chrome, and monochrome in the vertical column on the left. In the next column the means for Image Evaluation are listed as Disk, Multi-Chrome CCD and Monochrome CCD. In the final two columns, the various segments positioned into beam path A are listed for evaluating and recording.

| Recording Medium | Means of Image Evaluation | Segments Positioned into Path A During Evaluation | Segments Positioned into Path A During Recording |
| --- | --- | --- | --- |
| Film | Disk | 31, 27 | 31, 27 |
|  | Multi-chrome CCD | 31, 23 | 31, 25 |
|  | Monochrome CCD | 31, 23 | 31, 25 |
| CCD Multi-chrome | Disk | 31, 27 | 31, 27 |
|  | Multi-chrome CCD | 31, 23 | 31, 25 |
|  | Monochrome CCD | 31, 23 | 31, 25 |
| CCD Monochrome | Disk | 31, 33 | FF, 27 |
|  | Multi-chrome CCD | 31, 23 | FF, 27 |
|  | Monochrome CCD | 31, 23 | FF, 27 |
|  |  | or | or |
|  |  | FF, 23 | FF, 25 | where:
FF Selected color filter R. G, B on disk 29
31 Open screen on carrier wheel 29
23 LCD shutter segment on carrier wheel 21
25 White-light transmitting disk as focal-length adjusting filter with a given thickness and a given refraction index for the disk material
27 Open screen on carrier wheel 21.

It should be understood that the camera arrangement may be changed when required, and not all capabilities shown in the table must be provided in a particular embodiment.

Figure 5:
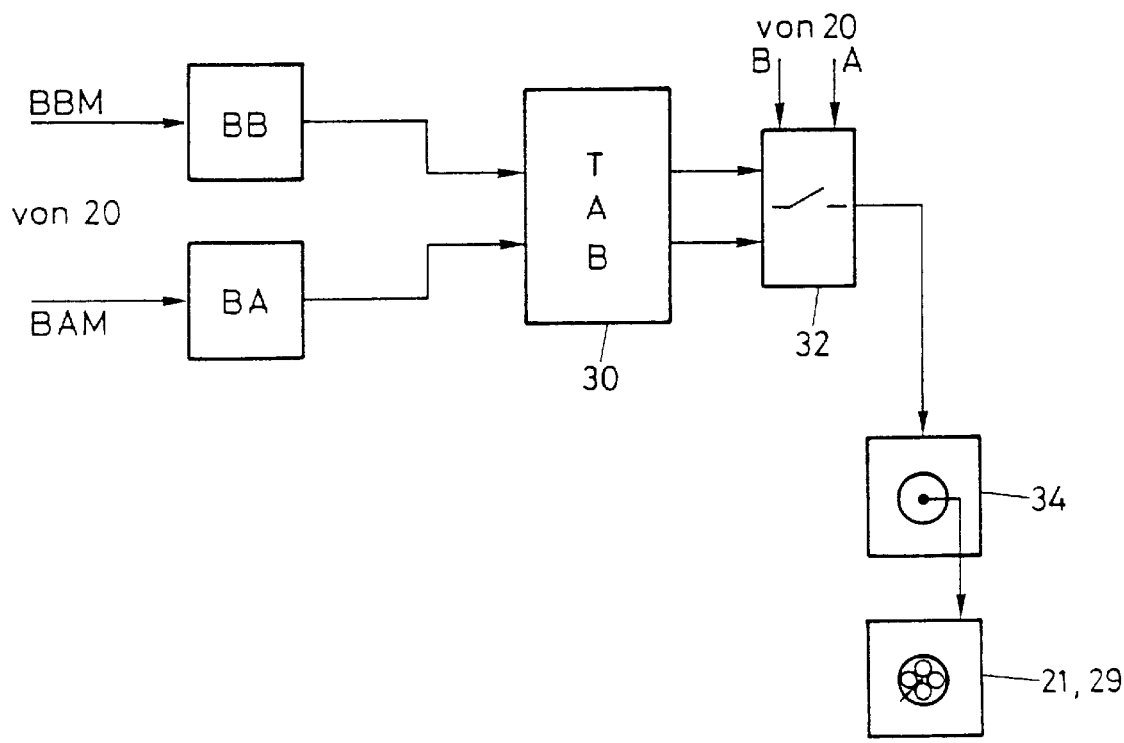
FIG. 5 is a schematic block diagram, based upon the arrangement of FIG. 3, showing signals and functions, of the automatic activation of devices in the image beam path according to a selected image evaluation and image recording medium.

According to FIGS. 1 and 2, adjustment devices 20, may be selected by means of a key-board on the camera housing 7. According to FIG. 5, the medium to be used in the image evaluation mode, and whether the adjusting disk 10 or the electronic arrangement for image acquisition are selected and fed in by signal BBM to a storage unit BB. Instead of a manual input, sensors can also be used to determine which medium is selected to be positioned in the image evaluation position.

The table unit 30 stores the combinations referred to above in the table. The signal from the storage units BB or BA to the table unit 30 cause it to produce outputs to the carrier wheels 21 and 29 for evaluation and recording as shown. In accordance with the table combinations, the current mode to be set, i.e., evaluation mode or recording mode, is selected by means of a selection unit 32 set according to table unit 30 using a selector key in band A. Accordingly the combinations determined by the table unit 30 are input to a positioning motor unit 34 for controlling a positioning motor to drive the carrier disks 29 and 29 into the required positions as shown.

I claim:

1. A still photo camera having an image beam path and a defined focal plane disposed in the image beam path, comprising: a slide arrangement slidably mounted slidable substantially perpendicularly to said image beam path and adjacent said focal plane, said slide arrangement comprising first and second mount-parts selectively slidable into alignment with said optical path, a chemical image recording arrangement being mounted to the first mount-part, an electronic image recording arrangement being mounted to the second mount-part, so that one of said recording arrangements may be selectively slid into operational position in alignment with said image beam path.

2. A still photo camera according to claim 1, comprising an adjusting disk insertable into the image beam path of the camera.

3. The still photo camera of claim 2, wherein the adjusting disk comprises a ground glass disk.

4. A still photo camera according to claim 2, wherein the adjusting disk is moveably mounted in the image beam path of the camera and lies in the focal plane when the film and the electronic arrangement are not inserted, and lies behind the focal plane upon insertion of either of the film and the electronic arrangement.

5. The still photo camera of claim 4, wherein the disk is spring mounted for positionment in the focal plane and behind the focal plane.

6. A still photo camera according to claim 1, wherein the electronic arrangement includes one of a monochrome arrangement, a multi-chrome arrangement, a monochrome CCD arrangement, and a multi-chrome arrangement with mosaic filters.

7. A still photo camera according to claim 1, wherein the arrangement for electronic image acquisition includes a live image display.

8. A still photo camera according to claim 7, including an electronic shutter, being operative to open and close at a selected frequency.

9. The still photo camera of claim 8, wherein the frequency is about 2 to 5 Hz.

10. The still photo camera of claim 8, wherein the shutter comprises an LCD shutter.

11. A still photo camera according to claim 1, having a lens position in front of the focal plane, comprising a filter arrangement being positionable between the lens position and the focal plane.

12. The still photo camera of claim 11, wherein the filter comprises a plurality of color filters (RGB) for selective insertion into the image beam path.

13. The still photo camera of claim 12, including a motor for inserting the filters into the image beam path.

14. A still photo camera according to claim 11, wherein the filter arrangement comprises a carrier disk supporting a plurality of filter disk segments and an open screen segment.

15. A still photo camera according to claim 1, including a broad-band transmission filter being insertable in the image beam path for equalizing a focal length corresponding to an image evaluation mode and an image recording mode of said camera.

16. A still photo camera according to claim 1, including at least one color filter and a broad-band filter, and an electronic shutter for establishing the same focal length for the at least one color filter and the broad-band filter.

17. A still photo camera according to claim 1, including a mechanical camera shutter and an electronic shutter.

18. A still photo camera according to claim 17, wherein the electronic shutter comprises an LCD shutter.

19. A still photo camera according to claim 17, wherein the electronic shutter is operable to open and close the optical beam path at a selected frequency.

20. A still photo camera according to claim 1, comprising:

image evaluation means including at least one of the adjusting disk and the electronic image recording arrangement selectively operable for image evaluation;

an input device for selecting the adjusting disk and the electronic image recording arrangement;

a sensor for sensing the adjusting disk and electronic arrangement, when selected;

an input device for the film and the electronic arrangement;

selectable means including an automatic shutter, a broad-band filter, selectable color filters, and an open screen being selectively positionable in the beam path in accordance with the selected evaluation means and recording medium.

21. A still photo camera according to claim 1, wherein the chemical image recording arrangement and the electronic image recording arrangement are removably mounted in the corresponding first and second mount parts.

22. A still photo camera having an image beam path and a defined focal plane disposed in the image beam path, comprising: a slide arrangement slidably mounted substantially perpendicularly to said image beam path and adjacent said focal plane, said slide arrangement comprising first and second mount-parts selectively slidable into alignment with said optical path, a chemical image recording arrangement being mounted to the first mount-part, an electronic image recording arrangement being mounted to the second mount-part, so that one of said recording arrangements may be selectively slid into operational position in alignment with said image beam path and an adjusting disk insertable in the image path.

23. A still photo camera having an image beam path and a defined focal plane disposed in the image beam path, comprising: a slide arrangement slidably mounted substantially perpendicularly to said image beam path and adjacent said focal plane, said slide arrangement comprising first and second mount-parts selectively slidable into alignment with said optical path, a chemical image recording arrangement being mounted to the first mount-part, an electronic image recording arrangement being mounted to the second mount-part, so that one of said recording arrangements may selectively be slid into operational position in alignment with said image beam path; and at least one of a color filter segment for positionment into the image beam path.

24. A still photo camera according to claim 23 further including an open segment in the optical beam path.

25. A still photo camera according to claim 23 further including a broad band filter in the optical beam path.

* * * * *